United States Patent Office 2,717,833
Patented Sept. 13, 1955

2,717,833

DIRECT POSITIVE EMULSIONS

Homer Albert Wark, Newton, N. J., assignor to Sperry Rand Corporation, New York, N. Y., a corporation of Delaware No Drawing. Application May 12, 1952,
Serial No. 287,428

30 Claims. (Cl. 95—7)

This invention relates to direct positive photographic emulsions and to processes for preparing same.

Direct positive emulsions are characterized by producing decreasing image density with increasing exposure to light or other image producing radiation over a limited range of exposure. Over a given light or radiation exposure range ordinary photographic emulsions upon development, on the other hand, produce increasing image density with increasing exposure. Beyond certain limits which vary with conditions of emulsion preparation, intensity and type of light or other radiation exposure and development, it is known that some emulsions, whether direct positive and ordinary emulsions, may reverse their initial image density producing characteristics. In such cases, in the exposure region where the initial image forming characteristics are reversed, ordinary emulsions may produce positive images or images of decreasing density with increasing exposure and direct positive emulsions may produce negative images or increasing image density with increasing exposure.

Direct positive photographic images can be produced by a number of methods which include, broadly, (a) methods in which the first exposure given to the emulsion modifies effects of a second exposure; (b) methods in which a second exposure modifies effects of the first exposure given the emulsion; and (c) methods in which the exposure is chemically modified to produce a direct positive image. In both classes (a) and (b), one of the exposure steps is performed with the aid of radiant energy usually in the visible region of the spectrum and the second exposure may be by either radiant energy or by chemical means. Processes for obtaining direct positive images by the general method (a), wherein the first exposure modifies the effects of a second exposure are further characterized depending upon their utilization of the principles of the Sabattier effect or the Albert-Precht effect, or utilization of reversal processing techniques sometimes identified as the color-screen plate reversal process. Direct positive processes according to the general method (b), wherein a second exposure modifies effects of the first exposure, may be more specifically designated according to their utilization of principles of the Herschel, Villard, or Clayden effects. Direct positive processes according to the general method (c) are for example, as shown in the patent to Hans Arens, Number 2,005,837 granted June 25, 1935, for "Manufacture of Photographic Emulsions."

The preparation of silver halide direct positive emulsions by various methods has also been described. The methods include fogging the emulsion by chemical means, by exposure to light, by X-rays or by high frequency mechanical oscillations either during or after precipitation of the silver halides. Other methods involve the use of large excesses of sensitizing dye and still other methods are based on the use of only a very small fraction of the total gelatin at the time of precipitation. Emulsions prepared with a mixture of a silver halide and a silver salt which develops without exposure to light have also been suggested for obtaining direct positives upon exposure and development.

In industrial photography, particularly in the field of document copy photography, it is desirable to be able to prepare direct positive copies of printed or written records and drawings with ordinary photographic printing equipment and with short exposure times. It is also desirable that the contrast of the photographic copies be equivalent to that of the original. In the preparation of direct positive images, whether by the use of direct positive emulsions or by use of regular emulsions with reversal-process techniques, low effective speed or sensitivity of the emulsion, or lack of contrast and veiled highlights of the positive image are difficulties often encountered with hitherto known processes and emulsions. High speed direct positive emulsions have been described but such emulsions fail to produce either low minimum density, high maximum density or both. On the other hand, high contrast direct positive emulsions are known but these are of extraordinarily low sensitivity.

It is accordingly an object of this invention to provide direct positive photographic emulsions of high sensitivity. A further object is to provide direct positive emulsions which have low minimum density and high contrast. A still further object is to provide a process for preparing new and improved direct positive photographic emulsions. Another important object is to provide direct positive emulsions capable of being sensitized in any selected region of the spectrum or in all regions of the spectrum. Other objects will be apparent from the description hereinafter given or will be specified in the following description of the invention.

According to the present invention, it has been found that direct positive photographic emulsions which have high speed and contrast may be prepared by precipitating silver halides in the presence of soluble salts of metals selected from group VIII of the periodic arrangement of the elements and then digesting the emulsions, said precipitation and digestion being carried out while maintaining the emulsions preferably on the basic side of neutrality. A second digestion, following setting, shredding and washing of the emulsions, is also carried out while the emulsions are preferably on the basic side of neutrality. However, the second digestion may or may not be at the same basicity as the first digestion. Desirably, the basic condition of the emulsions is also maintained during the final additions thereto and while the emulsions are being coated upon supports.

The group VIII metals whose soluble salts have been particularly found useful in the production of direct positive emulsions as herein described are cobalt, ruthenium, rhodium, palladium, osmium, iridium and platinum. While any of the water or ammonium hydroxide soluble salts of these metals are useful in the present emulsion preparation, the halogen salts, and particularly the chloride salts, are preferred. Inasmuch as relatively small amounts of the group VIII metal salts are employed, stock solutions representing the metallic salt in concentrations of 1 part in 10,000 or 20,000 parts of solution, all parts being by weight, have been found to be useful working solutions.

The amount of group VIII metal salts which may be used in preparing direct positive emulsions will vary depending on the photographic characteristics desired of the final emulsion. For greatest separation between maximum and minimum densities, the salts may be present at precipitation in amounts between 0.15 and 120 mg. per 100 grams of silver in the emulsions. With the use of the large amounts, there is a tendency for both the maximum and minimum densities to increase and while the difference between the extreme density values remains substantially unchanged in such cases, the increase in minimum density yields direct positive emulsions of specific or limited use.

The preferred salts for optimum results are the chlorides of ruthenium, rhodium and iridium. These salts are used in amounts ranging from 0.8 to 11.8 mg. per 100 grams of silver in the emulsion.

Mixtures of salts of group VIII metals may also be used. When salts of two or more different metals of group VIII are used, the total amount of the salts is preferably within the same 0.8 to 11.8 mg. range, as used for a single metal salt.

Specifically, precipitation of silver halide photographic emulsions while maintaining the same on the basic side of neutrality is readily accomplished by the use of an ammoniacal silver solution prepared by adding to the silver nitrate solution ammonium hydroxide in excess of that required to redissolve the silver hydroxide precipitate. A considerable excess of ammonium hydroxide, for example, from four to six times the amount required to redissolve the silver hydroxide precipitate, is advantageously used to produce high maximum density. However, direct positive emulsions of high speed may be obtained by using as little as about one-half the amount of ammonium hydroxide as is required to redissolve the silver hydroxide. The degree of basicity, as indicated by the hydrogen ion concentration at the time of precipitation and during digestion, should be relatively high but the basicity value is not critical and varies with the amount of ammonium hydroxide present at any given time, the pH of the gelatin, temperature of the solutions at the time of precipitation and the temperature and duration of digestion. Precipitation and digestion of the emulsion at pH values ranging from 7.5 to 10.5 and even higher have been found to produce direct positive emulsions of good, commercially acceptable, speed and satisfactory contrast.

It has also been found that direct positive emulsions which have very low minimum densities are obtained when the silver halides are precipitated in the presence of the soluble salts of metals selected from group VIII of the periodic arrangement of the elements and in the presence of highly basic organic nitrogen compounds, and digested in the presence of such nitrogenous bases. The organic nitrogenous bases include lower primary, secondary and tertiary aliphatic amines such as, for example, ethylamine, diethylamine, morpholine, hexamethylenediamine, ethylenediamine and triethylamine, polyalkyleneamines such as, for example, triethylenetetramine and hexamethylenetetramine, quaternary ammonium hydroxides such as, for example, tetramethylammonium hydroxide, and trimethylbenzyl-ammonium hydroxide, and heterocyclic amines such as, for example, pyridine, piperidine, N-methylpiperidine and piperazine. The organic nitrogenous bases are used in the same manner as ammonium hydroxide and in such amounts as are necessary to ensure that the silver halides are precipitated, digested and coated while maintaining the emulsion on the basic side of neutrality. When preparing a direct positive emulsion using organic nitrogenous bases, the silver halides are precipitated and given the first digestion at preferably a pH of 9.5 to 10.5 or even somewhat higher.

After the first digestion, the emulsions are chilled, set, shredded, washed and then either stored under refrigerated conditions until required for use, or remelted immediately after washing and given the second digestion while the emulsion is maintained on the basic side of neutrality. At the end of the second digestion the pH of the emulsion is preferably lowered by the addition of an acid, such as citric, sulfuric or hydrochloric acid, but is still maintained in an alkaline condition. The emulsion final compounds such as saponin as a spreading agent, chrome alum as a hardener, and suitable sensitizing dyes, are then added. The emulsion viscosity is adjusted by variation of the temperature or by addition of water, or both, and the emulsion is coated on its support while still on the basic side of neutrality.

The following examples illustrate preferred embodiments of the present invention.

EXAMPLE I

A silver bromochloride direct positive emulsion was prepared in the following manner:

*Solution A*

| | | |
|---|---|---|
| Silver nitrate | grams | 100 |
| Ammonium hydroxide (26–28%) | cc | 184 |
| Water | cc | 200 |

*Solution B*

| | | |
|---|---|---|
| Gelatin | grams | 40 |
| Water | cc | 2100 |

*Solution C*

| | | |
|---|---|---|
| Potassium bromide | grams | 77 |
| Sodium chloride | do | 7 |
| Potassium iodide | do | 1 |
| Iridium tetrachloride (1/20,000 soln.) | cc | 50 |
| Water | cc | 200 |

Solutions A, B, and C were heated to 140° F. Solution A was added to Solution B and Solution C was added to Solution AB. 700 grams of gelatin were then added and the emulsion was held at 140° F. for 10 minutes then chilled, set, shredded, and washed. After washing and remelting the emulsion, 40 cc. of a 0.65 per cent by weight potassium iodide solution were added and the emulsion was then degisted at 150° F. for 2 hours. After digestion the pH of the emulsion was lowered to 7.5 by the addition of the necessary quantity of citric acid, the temperature and viscosity were adjusted and the emulsion was coated onto a paper support and dried.

The emulsion of the coated support thus produced was next exposed to light or other activating radiation of intensity suitable for forming a latent image through a sensitometric step-wedge which had effective values of 3.00 and 0.8 as the maximum and minimum densities respectively.

The exposed emulsion was developed for 60 seconds at 68° F. in the following bath:

| | Grams |
|---|---|
| Methyl-p-aminophenol sulfate | 1.03 |
| Sodium sulfite, anhydrous | 15.00 |
| Hydroquinone | 4.00 |
| Sodium carbonate, anhydrous | 22.50 |
| Potassium bromide | 0.60 |

Water to make 1 liter.

The developed test sample was conventionally fixed, washed and dried. The maximum and minimum densities of the sample, as determined by a reflection densitometer, were 1.35 and 0.17 respectively. The gamma and relative speed values as determined from the sensitometric curve were 0.85 and 0.47 respectively.

A control emulsion coated on a support was prepared in the same manner as above with the exception that the iridium tetrachloride was omitted from solution C. Upon development this control sample produced only a heavy black density. When the control emulsion was given a sensitometric test as described above, the maximum (D-max.) and minimum (D-min.) densities were 1.52 and 1.48 respectively.

EXAMPLE II

A direct positive emulsion was prepared as described under Example I with the exception that 250 cc. of a 1/1000 solution of iridium tetrachloride were used in Solution C. A coated sample of the emulsion, when tested as described in Example I, produced a direct positive image of the step-wedge and the following values were derived from the sensitometric curve:

D-max. 1.54; D-min. 0.34; gamma 1.56; speed 0.00023.

EXAMPLE III

A chlorobromide direct positive emulsion was prepared in the same manner described under Example I but with 120 g. of sodium chloride in Solution C, 1.4 liters of water in Solution B, and 300 g. of gelatin after precipitation. A coated sample of the emulsion was tested as described in Example I and the following results were obtained:

D-max. 1.10; D-min. 0.29; gamma 2.00; speed 0.06.

EXAMPLE IV

A direct positive bromochloride emulsion was prepared as described under Example I but using 50 cc. of a 1/20,000 solution of rhodium trichloride dissolved in a 25 per cent, by weight, solution of sodium chloride in place of the iridium tetrachloride solution. This emulsion was given a second digestion of 3 hours. The final additions, coating and testing were as described in Example I. The tested emulsion produced the following results:

D-max. 1.34; D-min. 0.10; gamma 2.02; speed 0.004.

EXAMPLE V

A direct positive emulsion was prepared and coated in the manner described under Example I except that 50 cc. of a mixed solution comprising 25 cc. of 1/20,000 iridium tetrachloride solution and 25 cc. of a 1/20,000 solution of rhodium trichloride dissoved in a 25 per cent by weight, solution of sodium chloride, were used in place of the iridium tetrachloride solution. When tested as described in Example I this direct positive emulsion produced the following results:

D-max. 1.57; D-min. 0.13; gamma 1.98; speed 0.049.

EXAMPLE VI

An emulsion was prepared in the manner described under Example II except that 1.6 liters of water were employed in Solution B and 50 cc. of a 1/20,000 solution of ruthenium oxychloride, ammoniated,

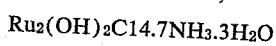

were used in place of thte iridium tetrachloride solution. The following results were obtained upon testing a sample of the coated emulsion:

D-max. 1.62; D-min. 0.26; gamma 0.8; speed 0.0034.

EXAMPLE VII

In place of the iridium tetrachloride solution of Example I, an emulsion was prepared in a similar manner but using 50 cc. of a 1/20,000 solution of ammonium chloroplatinate. A sample of the coated emulsion upon testing as described in Example I gave the following results:

D-max. 1.60; D-min. 0.30; gamma 1.15; speed 0.0098.

EXAMPLE VIII

The emulsion preparation described under Example I was repeated except that the total amount of gelatin was added in Solution B which also contained ethylene diamine instead of ammonium hydroxide. The formula for Solution B was as follows:

| | | |
|---|---|---|
| Gelatin | grams | 200 |
| Ethylene diamine (Pract.) | cc | 50 |
| Water | cc | 1600 |

The coated emulsion when tested as in Example I gave the following results:

D-max. 1.26; D-min. 0.02; gamma 3.51; speed 0.0034.

EXAMPLE IX

The emulsion preparation described under Example I was repeated substituting 40 cc. of ethylene diamine (Pract.) for the ammonium hydroxide of the first example. A coated sample of this direct positive emulsion gave the following results upon testing as described in Example I:

D-max. 1.53; D-min. 0.10; gamma 9.60; speed 0.011.

EXAMPLE X

A direct positive emulsion was prepared under Example I with the exception that the ammonium hydroxide was entirely omitted in Solution A. Solution A was added to Solution B at 140° F. and thereafter Solution C was added to Solution AB at 140° F. also. 700 grams of gelatin were then added and the emulsion was allowed to digest for 10 minutes at 140° F., then chilled, set, shredded and washed. After remelting the emulsion at 150° F., sufficient ethylene diamine was added to raise the pH to 8.25, and the emulsion was then digested for 1½ hours at 150° F. After digestion, the pH of the emulsion was lowered to 7.5 by the addition of the necessary quantity of citric acid. The emulsion was then processed and coated on a support as set forth in Example I.

A test sample of the emulsion treated as in Example I yielded the following results:

D-max. 1.58; D-min. 0.90; gamma 1.46; speed .0045.

EXAMPLE XI

A direct positive emulsion containing as basic organic nitrogen compound was prepared as follows:

Solution A

| | | |
|---|---|---|
| Silver nitrate | grams | 50 |
| Water | cc | 100 |

Solution B

| | | |
|---|---|---|
| Gelatine | grams | 20 |
| Triethylamine | cc | 89.9 |
| Water | cc | 800 |

Solution C

| | | |
|---|---|---|
| Potassium bromide | grams | 38.5 |
| Potassium iodide | do | 0.5 |
| Sodium chloride | do | 0.5 |
| Iridium tetrachloride (1/20,000 sol.) | do | 3.5 |
| Water | cc | 25 |
| | cc | 100 |

Solutions A, B and C were heated to 140° F., then Solution A was added to B and Solution C was added to Solution AB. 150 grams of gelatine were then added, the mixture allowed to digest for 10 minutes at 140° F., then set, shredded and washed. After remelting at 150° F., 20 cc. of a 65% potassium iodide solution was added and the emulsion was digested 1 hour at 150° F. Thereafter the pH of the emulsion was lowered to 7.5 by addition of citric acid. The emulsion was thereafter coated and tested as in Example I and the following results were obtained:

D-max. 1.60; gamma .67; speed .0105.

EXAMPLE XII

A direct positive emulsion was produced substantially as in Example XI but using 51.6 cc. of pyridine instead of the 89.9 cc. of triethylamine. This emulsion tested to the following results:

D-max. 1.63; gamma .74; speed .0054.

EXAMPLE XIII

A direct positive emulsion was produced as in Example XI but using 55 cc. of 70% ethylamine instead of 89.9 cc. of triethylamine. This emulsion tested to the following results:

D-max. 1.58; gamma 2.03; speed .0825.

In addition to the group VIII metal salts specifically described in the above examples, other salts of the same metals and of other metals of group VIII of the periodic arrangement of the elements are useful in the preparation of direct positive emulsions such as, for example, cobaltic chloride, iridium tribromide, iridium sesquichloride, iridium tetraiodide, osmium trichloride, palladium chloride, palladium iodide, platinic tetrachloride, platinic tetraiodide, rhodium nitrate, and ruthenium tetraoxide. While it is convenient to incorporate the group VIII metal salts in Solution C, that is, as part of the solution of salts used for precipitating the silver halides, the group VIII metal salts solution may be added separately to the redissolved silver oxide solution at the same time the solution of precipitating salts is added or to the gelatin.

The invention is not limited to the silver halides described in the above specific examples. Direct positive emulsions of silver bromide, silver bromoiodide, and other mixed silver halides may be prepared in the manner as herein described. In addition to sensitizing dyes, the emulsions may also contain chemical agents for modifying the color or tone of the developed silver images such as, for example, benzotriazole, trimethylol nitromethane, trimethylol melamine, and 4-hydroxy-6-methylquinoline which are advantageously incorporated in the emulsions by having such tone control agents present at the time of precipitation of the silver halides.

Instead of the paper supports as described in the above specific examples, the present invention contemplates the use of other well known photographic coating support materials such as films of cellulose esters, vinyl polymers, polyamides, and halogenated olefinic polymers, as well as metal film supports, textiles, and glass plates.

As is well known in the art, emulsion speed values derived from sensitometric data obtained from direct positive images have little direct relation to the effective speed of the emulsions under practical conditions of use. The quality of the light or type of radiation used for making the exposure has considerable influence on the quality of the positive image obtained with direct positive emulsions. In the above examples the emulsion speed figures represent 100/E where E is the antilog of the relative exposure value at density value D-max.—0.2. Under practical exposure conditions it has been found that with a printing box containing incandescent electric light bulbs rated at 480 watts, a good direct positive copy of a typewritten original on 16-pound, 100 percent rag stock white paper, can be obtained with an exposure of 2 to 6 seconds followed by a development as described under Example I. In this printing box the line voltage was maintained at 110 volts.

Only small amounts of salts of the metals of group VIII of the periodic arrangement of the elements have been shown to be necessary for preparing the direct positive emulsions according to the present invention. These metal salts have the essential effect of restraining and inhibiting Oswald ripening, allowing production of an increased number of sensitivity centers or development centers of large sizes.

One advantage of the present invention is that in its preferred form it provides a process for preparing photographic silver halide emulsions which yield positive images directly upon development after exposure thereof, said process representing a simplified emulsion preparation in that from the time of precipitating the silver halides up to and including the coating operations, the emulsion is maintained on the basic side of neutrality.

Since many widely differing embodiments of the invention can be made without departing from the spirit and scope thereof, it is to be understood that the invention is not to be limited except as defined by the claims.

While reference has hereinbefore been made to gelatine-based emulsions suitable for photographic use, it is obvious that the present invention can be practiced with other based emulsions or light sensitive layers for photographic use within the spirit and scope of the present invention.

What is claimed is:

1. In a process for the production of direct positive photographic emulsions according to which a light sensitive silver halide emulsion is produced by the steps of precipitation of the silver halide, first digestion of the emulsion, shredding, washing, remelting and second digestion, the improvement which comprises precipitating said silver halide in the presence of a soluble salt of a metal selected from group VIII of the periodic arrangement of the elements, in a ratio of the order of 0.15 to 393 milligrams of the group VIII metal per 100 grams of silver, and a metal complexing basic nitrogen compound, and maintaining the emulsion at a pH number higher than 7 throughout said second digestion.

2. In a process for the production of direct positive photographic emulsions according to which a light sensitive silver halide emulsion is produced by the steps of precipitation of the silver halide, first digestion of the emulsion, shredding, washing, remelting and second digestion, the improvement which comprises precipitating said silver halide in the presence of a soluble salt of a metal selected from group VIII of the periodic arrangement of the elements in an organic colloid binding agent, in a ratio of the order of 0.15 to 393 milligrams of the group VIII metal per 100 grams of silver, and a metal complexing basic nitrogen compound, and maintaining the emulsion at a pH number higher than 7 throughout said second digestion.

3. In a process for the production of direct positive photographic emulsions according to which a light sensitive silver halide emulsion is produced by the steps of precipitation of the silver halide, first digestion of the emulsion, shredding, washing, remelting and second digestion, the improvement which comprises precipitating said silver halide in the presence of a soluble halide of a metal selected from group VIII of the periodic arrangement of the elements in a ratio of the order of 0.15 to 393 milligrams of the group VIII metal per 100 grams of silver and a metal complexing basic nitrogen compound, and maintaining the emulsion at a pH number higher than 7 throughout said second digestion.

4. In a process for the production of direct positive photographic emulsions according to which a light sensitive silver halide emulsion is produced by the steps of precipitation of the silver halide, first digestion of the emulsion, shredding, washing, remelting and second digestion, the improvement which comprises precipitating said silver halide in the presence of a soluble halide of a metal selected from group VIII of the periodic arrangement of the elements in a ratio of the order of 0.15 to 393 milligrams of the group VIII metal per 100 grams of silver and a metal complexing basic nitrogen compound in an organic colloid binding agent, and maintaining the emulsion at a pH number higher than 7 throughout said second digestion.

5. In a process for the production of direct positive photographic emulsions according to which a light sensitive silver halide emulsion is produced by the steps of precipitation of the silver halide, first digestion of the emulsion, shredding, washing, remelting and second digestion, the improvement which comprises precipitating said silver halide in the presence of a soluble salt of a metal selected from group VIII of the periodic arrangement of the elements in an amount ranging from 0.15 to 120 milligrams per each 100 grams of silver in the emulsion, and a metal complexing basic nitrogen compound, and maintaining the emulsion at a pH number higher than 7 throughout said second digestion.

6. In a process for the production of direct positive photographic emulsions according to which a light sensitive silver halide emulsion is produced by the steps of precipitation of the silver halide, first digestion of the emulsion, shredding, washing, remelting and second digestion, the improvement which comprises precipitating said silver halide in the presence of a soluble salt of a metal selected from group VIII of the periodic arrangement of the elements in an amount ranging from 0.15 to 120 milligrams per each 100 grams of silver in the emulsion and a metal complexing basic nitrogen compound in an organic colloid binding agent, and maintaining the emulsion at a pH number higher than 7 throughout said second digestion.

7. In a process for the production of direct positive photographic emulsions according to which a light sensitive silver halide emulsion is produced by the steps of precipitation of the silver halide, first digestion of the emulsion, shredding, washing, remelting and second digestion, the improvement which comprises precipitating said silver halide in the presence of a soluble halide of a metal selected from group VIII of the periodic arrangement of the elements in a ratio of the order of 0.15 to 393 milligrams of the group VIII metal per 100 grams of silver and a metal complexing basic nitrogen compound in gelatin and maintaining the emulsion at a pH number higher than 7 throughout said second digestion.

8. In a process for the production of direct positive photographic emulsions according to which a light sensitive silver halide emulsion is produced by the steps of precipitation of the silver halide, first digestion of the emulsion, shredding, washing, remelting and second digestion, the improvement which comprises precipitating said silver halide in the presence of a soluble salt of a metal selected from group VIII of the periodic arrangement of the elements in a ratio of the order of 0.15 to 393 milligrams of the group VIII metal per 100 grams of silver and a metal complexing basic nitrogen compound in an organic colloid binding agent, and coating the said emulsion on a support, and maintaining the emulsion at a pH number higher than 7 throughout said second digestion, and coating.

9. In a process for the production of direct positive photographic emulsions according to which a light sensitive silver bromide emulsion is produced by the steps of precipitation of the silver bromide, first digestion of the emulsion, shredding, washing, remelting and second digestion, the improvement which comprises precipitating said silver bromide in the presence of a soluble salt of a metal selected from group VIII of the periodic arrangement of the elements in an amount ranging from 0.15 to 120 milligrams per 100 grams of silver in the emulsion, and a metal complexing basic nitrogen compound, and maintaining the emulsion at a pH number higher than 7 throughout said second digestion.

10. In a process for the production of direct positive photographic emulsions according to which a light sensitive silver bromochloride emulsion is produced by the steps of precipitation of the silver bromochloride, first digestion of the emulsion, shredding, washing, remelting and second digestion, the improvement which comprises precipitating said silver bromochloride in the presence of a soluble salt of a metal selected from group VIII of the periodic arrangement of the elements in an amount ranging from 0.15 to 120 milligrams per each 100 grams of silver in the emulsion, and a metal complexing basic nitrogen compound and maintaining the emulsion at a pH number higher than 7 throughout said second digestion.

11. In a process for the production of direct positive photographic emulsions according to which a light sensitive silver bromochloride emulsion is produced by the steps of precipitation of the silver bromochloride, first digestion of the emulsion, shredding, washing, remelting and second digestion, the improvement which comprises precipitating said silver bromochloride in the presence of a soluble halide of a metal selected from group VIII of the periodic arrangement of the elements in a ratio of the order of 0.15 to 393 milligrams of the group VIII metal per 100 grams of silver and a metal complexing basic nitrogen compound, and maintaining said emulsion at a pH number higher than 7 throughout said second digestion.

12. The process defined in claim 1, in which the soluble salt is at least one salt selected from the group consisting of the salts of cobalt, iridium, palladium, platinum, rhodium and ruthenium.

13. The process defined in claim 1 using as the soluble salt, at least one salt selected from the group consisting of the chloride salts of cobalt, iridum, palladium, platinum, rhodium and ruthenium.

14. The process defined by claim 1 in which the soluble group VIII metal salt is iridium tetrachloride.

15. The process defined by claim 1 in which the soluble group VIII metal salt is rhodium trichloride.

16. The emulsion obtained by the process defined by claim 1.

17. The emulsion obtained by the process defined by claim 2.

18. The emulsion obtained by the process defined by claim 3.

19. The emulsion obtained by the process defined by claim 4.

20. The emulsion obtained by the process defined by claim 8.

21. The emulsion obtained by the process defined by claim 9.

22. The emulsion obtained by the process defined by claim 10.

23. The emulsion obtained by the process defined by claim 5.

24. The emulsion obtained by the process defined by claim 6.

25. The emulsion obtained by the process defined by claim 7.

26. The emulsion obtained by the process defined by claim 11.

27. The emulsion obtained by the process defined by claim 12.

28. The emulsion obtained by the process defined by claim 13.

29. The emulsion obtained by the process defined by claim 14.

30. The emulsion obtained by the process defined by claim 15.

References Cited in the file of this patent

UNITED STATES PATENTS

| | | |
|---|---|---|
| 2,284,877 | Martinez | June 2, 1942 |
| 2,399,083 | Waller et al. | Apr. 23, 1946 |
| 2,448,060 | Smith et al. | Aug. 31, 1948 |
| 2,552,229 | Stauffer et al. | May 8, 1951 |
| 2,597,856 | Damschroder | May 27, 1952 |

FOREIGN PATENTS

| | | |
|---|---|---|
| 602,158 | Great Britain | May 20, 1948 |
| 626,053 | Great Britain | July 8, 1949 |